United States Patent
Taylor

[15] 3,642,224
[45] Feb. 15, 1972

[54] WIRE REELING DEVICE

[72] Inventor: John D. Taylor, Box 5, Perryton, Tex. 79070

[22] Filed: Jan. 22, 1970

[21] Appl. No.: 5,079

Related U.S. Application Data

[63] Continuation-in-part of Ser. No. 771,733, Oct. 30, 1968, abandoned.

[52] U.S. Cl. ..................................... 242/86.61, 242/158 B
[51] Int. Cl. ............................................. B65h 75/40
[58] Field of Search ............... 242/86.61, 86.6, 86.62, 86.63, 242/86.64, 86.8, 94, 158 B, 157.1

[56] References Cited

UNITED STATES PATENTS

| | | | |
|---|---|---|---|
| 511,542 | 12/1893 | Opper | 242/86.8 |
| 601,827 | 4/1898 | Dahlberg | 242/86.61 |
| 830,239 | 9/1906 | Lingenfelter | 242/86.61 |
| 1,205,803 | 11/1916 | Skjonhaug | 242/86.61 |
| 1,317,108 | 9/1919 | Skornia | 242/86.61 |
| 1,753,503 | 4/1930 | Colman | 242/158 X |
| 2,563,377 | 8/1951 | Schmidt | 242/86.61 |
| 3,416,748 | 12/1968 | Bliss | 242/158 B |

*Primary Examiner*—Stanley N. Gilreath
*Assistant Examiner*—Milton Gerstein
*Attorney*—Robert K. Rhea

[57] ABSTRACT

A two-wheel trailer frame horizontally journals a reel in a parallel vertically spaced relation with respect to the trailer axle. The reel is rotated in response to forward movement of the trailer by a frame supported clutch frictionally engaging the periphery of one trailer wheel. Frame supported belt, pulley, chain and sprocket means, connected with the other end of the reel, reciprocate a wire guide transversely of the reel as the trailer is moved forwardly.

5 Claims, 8 Drawing Figures

JOHN D. TAYLOR
*INVENTOR.*

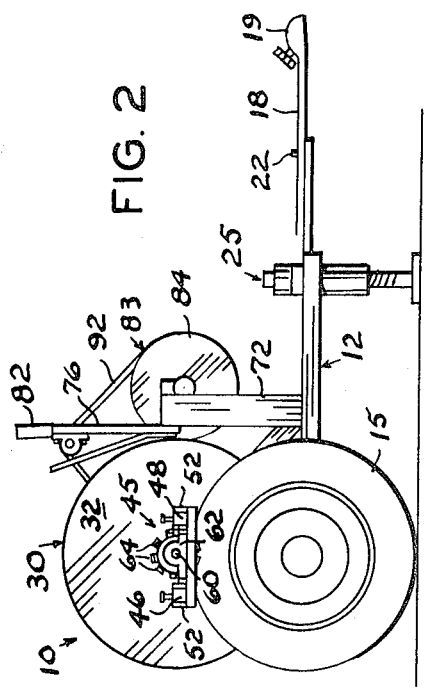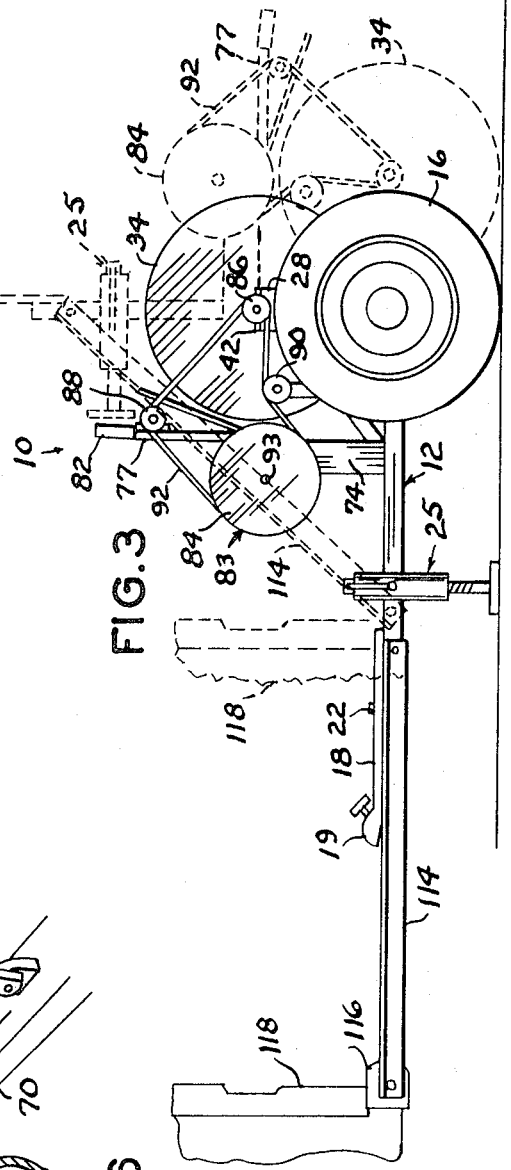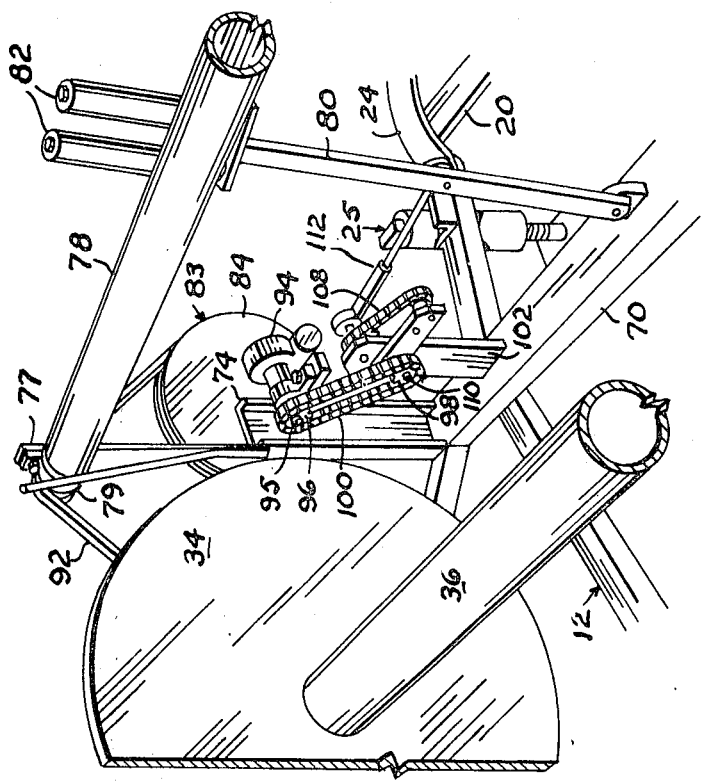

WIRE REELING DEVICE

CROSS REFERENCE TO RELATED APPLICATION

The present invention is a continuation-in-part of an application filed by me in the U.S. Patent Office under Ser. No. 771,733 on Oct. 30, 1968 for WIRE HANDLING DEVICE, now abandoned.

BACKGROUND OF THE INVENTION

1. Field of the Invention

The present invention relates to wire handling and more particularly to a device for spooling or stringing a strand of wire along a fence row, or the like.

Wire handling, while building or dismantling fences surrounding relatively small tracts of land, usually presents no problem with respect to the handling of the wire. When such a fence is dismantled or torn down the wire is usually rolled up manually, however, in building, dismantling or moving fences on large estates, such as farms or ranches, comprising several sections of land, the quantity of wire used fills a relatively large reel or reels when wound thereon. Furthermore, the wire used on farms and ranches is usually barbed wire and is not as easily handled as is smooth wire.

The principal distinction of this invention over the above referred to application resides in the wire guiding or distributing features of the wire as it is wound on the reel.

2. Description of the Prior Art

Wire reeling devices of this class are disclosed by U.S. Pat. Nos. 601,827 and 886,160. Each of these patents feature a wire guide or distributor which is moved in a to-and-fro action longitudinally of the wire receiving reel by a pitman connected with a peripheral portion of a rotating wheel. I have found that such a pitman actuating wire distributor has the failing of depositing a disproportionate number of convolutions of the wire at the respective end portions of the reel as a result of the pitman not moving the wire guide during the time the pitman traverses the arc described by its connection with the actuating wheel when the wheel connected end of the pitman is at the respective limit of its travel on a diameter line of the wheel parallel with respect to the axis of the reel. When winding small quantities or lengths of wire this feature is not too objectionable but when reeling in relatively long lengths of wire, for example, 5 or more miles, the disproportionate buildup of the wire at the respective ends of the reel results in an undesirable distribution of the wire on the reel wherein the endmost convolutions fill the reel while the central portion thereof is not filled. Furthermore, the end-of-the-reel buildup of the wire convolutions increase the tendency of the wire loops to crowd toward the center of the reel and become entangled. U.S. Pat. No. 2,759,683 discloses a wire reel device controlled by a wheel engaging friction clutch. However, this patent does not disclose a wire distributing device for winding wire on a reel.

This invention, on the other hand, provides a simplified two-wheel trailerlike frame which journals a relatively large reel capable of spooling a wire several miles in length thereon so that in operation, when towing this wire reeling device behind a pickup truck, the wire can be spooled or released at a rate of travel of 10 to 20 miles per hour. Furthermore, this invention provides a wire distributing device which moves a wire guide in a to-and-fro action longitudinally of the reel wherein the guide direction of movement is reversed at the respective end of the reel with substantially no time delay in the reversing action. The mass of the wire filling the reel is relatively large but the filled reel is easily removed from the supporting trailer frame by pivoting one end of the trailer frame upwardly about the axis of its supporting wheels to deposit the reel on the surface of the earth and similarly install an empty reel on the trailer.

SUMMARY OF THE INVENTION

A two-wheel trailer frame adapted to be towed, in laterally offset trailing relation behind a vehicle, transversely supports a flanged cylinder type reel in parallel elevated relation with respect to its axle and wheels. Frictional clutch means removably mounted on the frame at one end of the reel rotates the reel in response to the forward movement of the trailer by contact with the periphery of one of the trailer wheels.

A wire spooling distributor is moved longitudinally of the reel by belt, pulley, chain and sprocket and gear means connected with the other end of the reel.

The principal object of this invention is to provide a trailer type wire reeling device having an improved wire distributor.

BRIEF DESCRIPTION OF THE DRAWINGS

FIG. 2 is a right-side elevational view, to a reduced scale;

FIG. 3 is a left-side elevational view of the device illustrating, by solid and dotted lines, the relative position of a fragmentary end portion of a towing vehicle pivoting the device to a wire loading and unloading position;

FIG. 6 is a fragmentary perspective view illustrating the drive connection of the wire distributing means;

DESCRIPTION OF THE PREFERRED EMBODIMENT

Figures 1, 8:
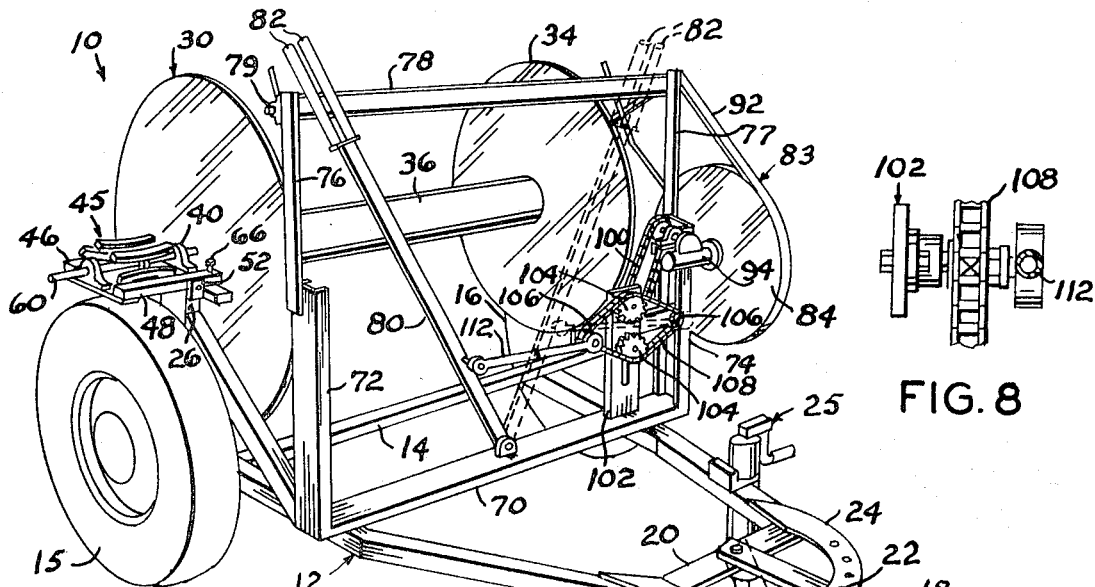
FIG. 1 is a perspective view of the device.
Figures 4, 5, 7:
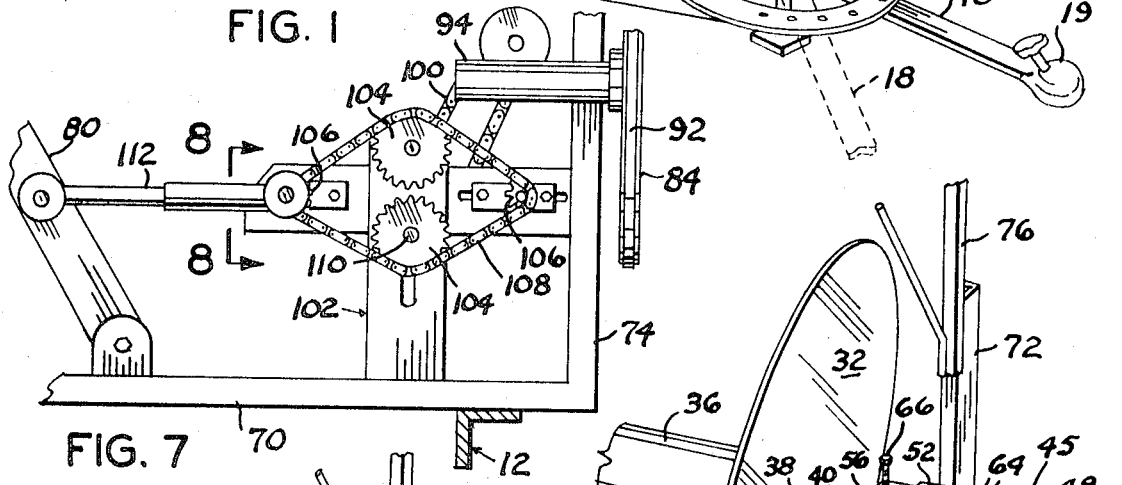
FIG. 4 is a fragmentary perspective view, to a different scale, of one flanged end of the wire reel illustrating the manner in which it is supported by the frame adjacent and above one wheel.
FIG. 5 is a view similar to FIG. 4 including the wheel engaging reel driving clutch means.
FIG. 7 is a fragmentary elevational view, to a different scale, of the wire guide drive; and, FIG. 8 is a fragmentary elevational view, partially in section, looking in the direction of the arrows 4—4 of FIG. 7.

Like characters of reference designate like parts in those figures of the drawings in which they occur.

In the drawings:

The reference numeral 10 indicates the device, as a whole, comprising a two-wheel trailer frame 12 having an axle 14 which journals wheels 15 and 16, preferably having pneumatic tires, at its respective ends. The forward end portion of the trailer frame is provided with a tongue 18 having a trailer hitch 19 at its free forward end with the rearward end of the tongue pivotally connected with a frame cross brace 20 and removably connected, intermediate its ends, by a bolt 22 to an arcuate yoke 24 for the purposes presently explained.

A screw-type jack 25 is rigidly connected to one side of the frame 12 for horizontally supporting the frame and placing the tongue in trailer hitch connecting position when the device is idle. The frame 12 is provided with standards 26 and 28 projecting upwardly from the position of the axle 14 inwardly of the respective wheel 15 and 16 and terminating in a horizontal plane in spaced relation with respect to the periphery of the wheels.

A wire holding reel of the flanged cylinder type is indicated generally at 30 and comprises a pair of end members or flanges 32 and 34 diametrically substantially equal with respect to the diameter of the wheels 15 and 16 and interconnected coaxially by a spindle 36 surrounding and connected at the respective outer surface of each flange with an axle 38. The respective end portions of the axle 38 are journaled by bearings 40 and 42 respectively mounted on the upper end of the standards 26 and 28. Thus, the horizontal axis formed by the axle 38 is spaced above the upper limit of the respective wheel 15 and 16.

Clutch means 45 drives the reel 30 in response to forward movement of the trailer. The clutch means 45 comprises a rectangular frame including parallel interconnected side members 46 and 48 which overlie, at one end portion, a bar 50 horizontally interposed between the bearing 40 and upper end of the standard 26. The bar 50 laterally supports two pairs of spaced-apart horizontally apertured parallel ears 52 so that bolts 54, cooperatively received by the apertured ears and clutch side members 46 and 48, form a horizontal fulcrum point or axis for the clutch frame as hereinafter described.

The clutch 45 further includes a universal joint 56 which slidably receives a splined-end portion 58 of the adjacent end portion of the reel axle 38. The other end of the universal joint is coaxially connected with a stub shaft 60 journaled by a bearing 62 at the end of the clutch frame opposite the universal joint. A clutch wheel, having a concave periphery formed by a plurality of circularly arranged inwardly bowed spaced-apart stavelike members 64, are connected in longitudinal parallel coaxial relation to the stub shaft 60. The concave arc, defined by the outer surface of the respective stave members 64, is complemental with respect to the transverse surface of the periphery of the wheel 15. The arcuate surface of revolution, generated by the bowed concave surface of the staves 64, is maintained in frictional driving and slipping contact with respect to the periphery of the wheel 15 by adjusting screws 66 extending through the respective end of the clutch frame members 46 and 48 and forcibly contacting the bar 50 to fulcrum the clutch frame, toward and away from the wheel 15, about the horizontal axis of the bolts 54.

A cross member 70, extending transversely of the frame 12, includes uprights 72 and 74 at its respective ends, terminating, respectively, in upstanding angle iron members 76 and 77 which journal a wire supporting roller 78 parallel with the reel spindle 36 by bearings 79. The roller 78 forms a support for wire, not shown, being wound on the reel 30. An upstanding elongated shunting lever or wire distributing arm 80 is pivotally connected to the cross brace 70 medially its ends. The distributor arm 80 supports, by its upwardly disposed end, a pair of roller guides 82 arranged in parallel relation and journaled by parallel rods.

As shown more clearly in FIGS. 1, 3 and 6, a drive for the distributor arm 80 is provided comprising a belt and pulley means 83 which includes a pulley 84 coaxially connected to and supported by one shaft 93 of a gear train in turn connected to the upper end portion of the upright 74; a drive pulley 86 on the reel axle 38 at that end opposite the clutch means 45; a pulley 88 on the adjacent end of the wire roller 78 and an idler pulley 90 supported by the frame with a belt 92, or the like, entrained around the respective pulleys 84, 86, 88 and 90 so that the pulleys 84 and 88 are driven in the same direction of rotation as the reel 30. The gear train 94 is provided with a second shaft 95 at right angle with respect to its shaft 93. The shaft 95 is coaxially connected to a sprocket 96 aligned with and connected to a driven sprocket 98 by a chain 100. The driven sprocket 98 is mounted above the cross brace 70 on the rearward side of an upstanding sprocket support bracket 102.

First and second pairs of sprockets 104 and 106, respectively, are mounted on the forward vertical face of the sprocket support bracket 102 in face to face aligned relation. The first pair of sprockets 104 is arranged in vertical spaced relation while the second or center pair of sprockets 106 is arranged in horizontal spaced relation and opposing laterally paced relation with respect to the center of a vertical line through the axes of the first pair of sprockets 104. Diametrically the end or second pair of sprockets 106 are relatively small for the purposes presently apparent while the diameter of each of the other pair of sprockets 104 is substantially greater than the diameter of the sprockets 106. An endless chain 108 is entrained around the respective pairs of sprockets 104 and 106 substantially defining a diamond-shaped configuration with the major axis of the diamond-shaped parallel with respect to the axis of the reel spindle 36. One of the pairs of sprockets 104, for example the lower one, is mounted on a shaft 110 extending through the sprocket bracket 102 and coaxially connected with the driven sprocket 98 so that as the driven sprocket 98 is rotated by the chain 100, the chain 108 is caused to travel in the same direction of rotation. A pitman 112 has one end thereof pivotally connected with one of the chain links on the forward side of the chain 108. The other end of the pitman 112 is pivotally connected to an intermediate portion of the distributor arm 80. Thus, as the reel 30 is rotated by forward movement of the device the belt, pulley, chain and sprocket means moves the chain connected end of the pitman, in the diamond-shaped path formed by the chain 108, wherein the movement of the chain connected end of the pitman, around the relatively small arc of the circumference of the respective lateral sprockets 106, results in a change or reversing direction of the pitman movement so that the wire guide rollers 82 hesitate or stop at the respective end of the reel 30, a period of time less than the time required for a complete revolution of the reel. The size of the vertically spaced first pair of sprockets 104 and their spaced-apart relation is selected to coordinate the rate of movement of the distributor arm 80 throughout the longitudinal central portion of the reel so that the distribution of the wire on the reel is substantially equal to the convolutions being wound on the end portions of the reel. Obviously, a single sprocket of a selected size may be used in place of the pair of sprockets 104.

OPERATION

In a loose wire spooling operation assume, a string of loose wire of 1 or more miles in length is lying beside a fence row. The trailer tongue 18 is pivoted to approximately the dotted line position of FIG. 1 and the hitch 19 is connected with a trailer hitch ball, not shown, preferably attached to the left-end portion of a pickup truck bumper. This positions the device 10 in a lateral left-side or offset trailing position with respect to the direction of travel of the pickup truck so that the pickup truck may be driven along and in parallel spaced relation with respect to the position of the wire to be spooled so that the device 10 is substantially aligned, in a direction of travel, longitudinally of the wire. Furthermore, this permits the driver to more easily observe the spooling action so that he may stop the truck in the even of any malfunction. A free or beginning end of the wire is manually positioned between the distributor bar rollers 82, over the roller 78 and attached to the spindle 36 of the reel 30. The clutch 45 is adjusted by the screws 66 so that the clutch wheel engages the trailer wheel 15 to rotate the reel 30. The frictional engagement between the clutch 45 and the periphery of the wheel 15 is such that the clutch will slip to compensate for differences in the rate in rotation of the reel with respect to the wheels 15 and 16, for example, when the wire winding is initially begun on the spindle 36 the rate of rotation of the reel is relatively fast because of the small diameter of the spindle as compared to the necessary rate of rotation of the reel 30 after the wire has substantially filled the reel 30 and the substantially cylindrical surface, formed by the wound up wire, is substantially greater than the surface of the spindle 36. During the wire spooling action the distributor bar 80 is moved by the above-described belt, pulley, chain and sprocket means, transversely of the reel in a to-and-fro action as the device 10 is towed along a fence row thereby filling or substantially filling the space between the reel flanges 32 and 34.

It is sometimes desirable to deposit a wire filled reel 30 and replace it with an empty one for spooling other wire. As shown more clearly in FIG. 3, this is accomplished by temporarily supporting the tongue 18 by the stand or jack 25 and pivotally connecting an elongated member such as a length of angle iron 114 to one end portion of a pickup truck bumper 116 and to a forward end portion of the trailer frame 12. Thereafter the pickup truck, indicated fragmentarily at 118, is backed toward the device 10 so that the forward end portion of the trailer frame 12 pivots upwardly about the horizontal axis formed by its wheels 15 and 16 to the position shown by dotted lines. Thus the truck, through the member 114, supports the mass of the spooled wire during this movement. When the device 10 is rotated to its dotted line position of FIG. 3, the bearings 40 and 42 are disconnected from the standards 26 and 28 and another empty reel, now shown, replaces the reel 30. Forward movement of the pickup truck then pivots the device to a normal towing position.

Unspooling or paying out wire wound on the reel, for fence building, is accomplished by simply attaching the free end of the spooled wire to a fence post, not shown, positioned rearwardly of the device 10 and truck, and driving the pickup truck along the fence row. Prior to the beginning of the paying out action of the wire the clutch means is adjusted for relatively loose contact with the wheel 15 to increase the tension on the wire and insure that the reel does not release the wire at a rate greater than the speed of the truck.

Obviously the invention is susceptible to changes or alterations without defeating its practicability, therefore, I do not wish to be confined to the preferred embodiment shown in the drawings and described herein.

I claim:

1. A wire reeling device, comprising:
   a trailerlike frame having a cross brace and having a transverse axle at its rearward end journaling a pair of supporting wheels;
   reel means comprising a spindle having a coaxial flange at its respective ends and having a shaft projecting coaxially outward from the respective flange and horizontally journaled by said frame on a transverse axis spaced above the upper limit of said wheels, the diameter of said flanges being equal to the diameter of said wheels;
   clutch means supported by said frame in frictional contact with a peripheral portion of one said wheels and drivably connected with said reel means;
   wire distributing means mounted on said frame,
   said wire distributing means including an elongated upstanding arm pivotally connected at its depending end to an intermediate portion of said cross brace, a wire guide means connected with the upper end portion of said arm, a bracket transversely mounted on one end portion of said cross brace, a plurality of cooperatingly aligned sprockets mounted on said bracket, a pitman drive chain entrained around said sprockets and describing an elongated substantially diamond-shaped path with the major axis of the diamond-shape parallel with the axis of said reel means, a pitman connected at one end with an intermediate portion of said arm and connected at its other end with an intermediate portion of said pitman drive chain; and,
   belt and pulley means drivably connecting said reel means with at least one of said plurality of sprockets.

2. Structure as specified in claim 1 in which said wire distributing means further includes:
   an elongated roller journaled by said frame in a horizontal plane spaced above and parallel with respect to the horizontal axis of said reel means,
   said wire guide means comprising a pair of upstanding laterally spaced-apart roller guides mounted on the upper end of said arm and projecting in offset relation above and below the axis of said elongated roller.

3. Structure as specified in claim 2 in which said plurality of sprockets includes:
   a first pair of vertically spaced sprockets; and,
   a second pair of relatively small diameter sprockets horizontally spaced-apart laterally of a line taken through the axis of said first pair of sprockets a distance greater than the diameter of said first pair of sprockets.

4. Structure as specified in claim 3 and further including:
   a pair of ears fixed on said trailer frame on diametrically opposite sides of one end portion of said reel shaft,
   said clutch means further including a clutch frame pivotally connected with and between said ears and projecting outwardly beyond a vertical plane defined by the adjacent said wheel for vertical pivoting movement of said clutch frame toward and away from a peripheral portion of said wheel,
   a stub shaft journaled by said clutch frame coaxial with and connected at one end portion to said reel shaft, and
   clutch roller means coaxially connected with said stub shaft within said clutch frame.

5. Structure as specified in claim 4 in which said clutch roller means comprises:
   a plurality of elongated slatlike members connected in radial and circumferentially spaced relation with said stub shaft,
   each said slatlike member being arcuately bowed inwardly throughout its length toward said stub shaft forming a concave cylindrical surface conforming to the transverse surface of an arc of the periphery of said wheel.

* * * * *